United States Patent
Phogat et al.

(10) Patent No.: US 12,475,619 B2
(45) Date of Patent: Nov. 18, 2025

(54) FILLING OVERLAPPING AREAS OF A VECTOR GRAPHICAL REPRESENTATION USING A SIMPLE GRAPH

(71) Applicant: Adobe Inc., San Jose, CA (US)

(72) Inventors: Ankit Phogat, Noida (IN); Vishwas Jain, Bengaluru (IN); Vineet Batra, Delhi (IN); Souymodip Chakraborty, Bengaluru (IN); Kevin Wampler, Seattle, WA (US)

(73) Assignee: Adobe Inc., San Jose, CA (US)

( * ) Notice: Subject to any disclaimer, the term of this patent is extended or adjusted under 35 U.S.C. 154(b) by 243 days.

(21) Appl. No.: 18/205,419

(22) Filed: Jun. 2, 2023

(65) Prior Publication Data
US 2024/0404139 A1    Dec. 5, 2024

(51) Int. Cl.
G06T 11/40    (2006.01)
G06T 7/30     (2017.01)
G06V 10/44    (2022.01)

(52) U.S. Cl.
CPC .......... *G06T 11/40* (2013.01); *G06T 7/30* (2017.01); *G06V 10/44* (2022.01)

(58) Field of Classification Search
CPC ......... G06T 11/40; G06T 7/30; G06T 11/203; G06V 10/44
See application file for complete search history.

(56) References Cited

U.S. PATENT DOCUMENTS

| 4,815,009 A * | 3/1989 | Blatin | G06T 11/40 345/441 |
|---|---|---|---|
| 6,111,587 A * | 8/2000 | Covey | G06T 11/40 345/643 |
| 2003/0122830 A1* | 7/2003 | Yap | G06T 11/40 345/441 |
| 2008/0174602 A1* | 7/2008 | Hsu | G06T 15/00 345/441 |
| 2011/0242109 A1* | 10/2011 | Huang | G06T 11/203 345/442 |
| 2015/0022530 A1* | 1/2015 | Perry | G06V 9/20 345/441 |

(Continued)

OTHER PUBLICATIONS

Cui, Y., Liu, Q., Chen, G., & Zhang, H. (2020). A general method for decomposing self-intersecting polygon to normal based on self-intersection points. Theoretical Computer Science, 842, 118-129 (Year: 2020).*

(Continued)

*Primary Examiner* — Daniel F Hajnik
*Assistant Examiner* — Adeel Bashir
(74) *Attorney, Agent, or Firm* — Kilpatrick Townsend & Stockton LLP

(57) ABSTRACT

Certain aspects and features of the present disclosure relate to receiving an input corresponding to a fill for a vector graphical representation including an overlapping area. Aspects and features further involve converting the vector graphical representation to a simple graph, and aligning contours within the simple graph to provide a unified winding number for the overlapping area. Aspects and features also involve rendering the vector graphical representation with the fill using the simple graph to include the overlapping area within the rendered representation as filled.

17 Claims, 11 Drawing Sheets

(56) References Cited

U.S. PATENT DOCUMENTS

2015/0022531 A1\* 1/2015 Perry .................... G06T 11/203
345/468

OTHER PUBLICATIONS

Shor, P. W., & Van Wyk, C. J. (Jun. 1989). Detecting and decomposing self-overlapping curves. In Proceedings of the fifth annual symposium on Computational geometry (pp. 44-50). (Year: 1989).\*
Vatti, B. R. (1992). A generic solution to polygon clipping. Communications of the ACM, 35(7), 56-63. (Year: 1992).\*
Kallio, K. (2007). Scanline edge-flag algorithm for antialiasing. (Year: 2007).\*
Unpublished U.S. Appl. No. 17/960,582, filed Oct. 5, 2022—stored in USPTO Image File Wrapper System. In accordance with the Waiver of the Copy Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.

\* cited by examiner

FILLING OVERLAPPING AREAS OF A VECTOR GRAPHICAL REPRESENTATION USING A SIMPLE GRAPH

TECHNICAL FIELD

The present disclosure generally relates to graphic design using vector-based computer graphics. More specifically, but not by way of limitation, the present disclosure relates to techniques for rendering fills of vector graphical representations.

BACKGROUND

Vector graphics is one of the most powerful, and versatile forms of graphic design. Vector graphics can be used to represent a wide variety of content, such as icons, logos, fonts, maps, posters, etc. in a resolution independent fashion. A vector graphics application defines standard path objects for a vector graphical representation that is inherently linear, i.e., the order in which constructs are stored necessarily defines, at least to some extent, their relationship with one another. In some vector-based representations, the end point of a curve is joined to the starting point via a line, providing a closed region that can be filled to provide color or shading of the design as required. Vector graphs provide more design versatility that such representations by using a topology in which any primitive can be attached to other primitives to define a contour, a connected sequence of primitives such as lines, circular arcs, Bezier curves, and conics.

SUMMARY

Certain aspects and features of the present disclosure relate to rendering fills for vector graphics. For example, a method involves receiving an input corresponding to a fill for a vector graphical representation, where the vector graphical representation includes an overlapping area. The method also involves converting the vector graphical representation to a simple graph. The method further involves aligning contours within the simple graph to provide a unified winding direction for the overlapping area. The method also involves rendering the vector graphical representation with the fill using the simple graph to include the overlapping area within a rendered representation as filled.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
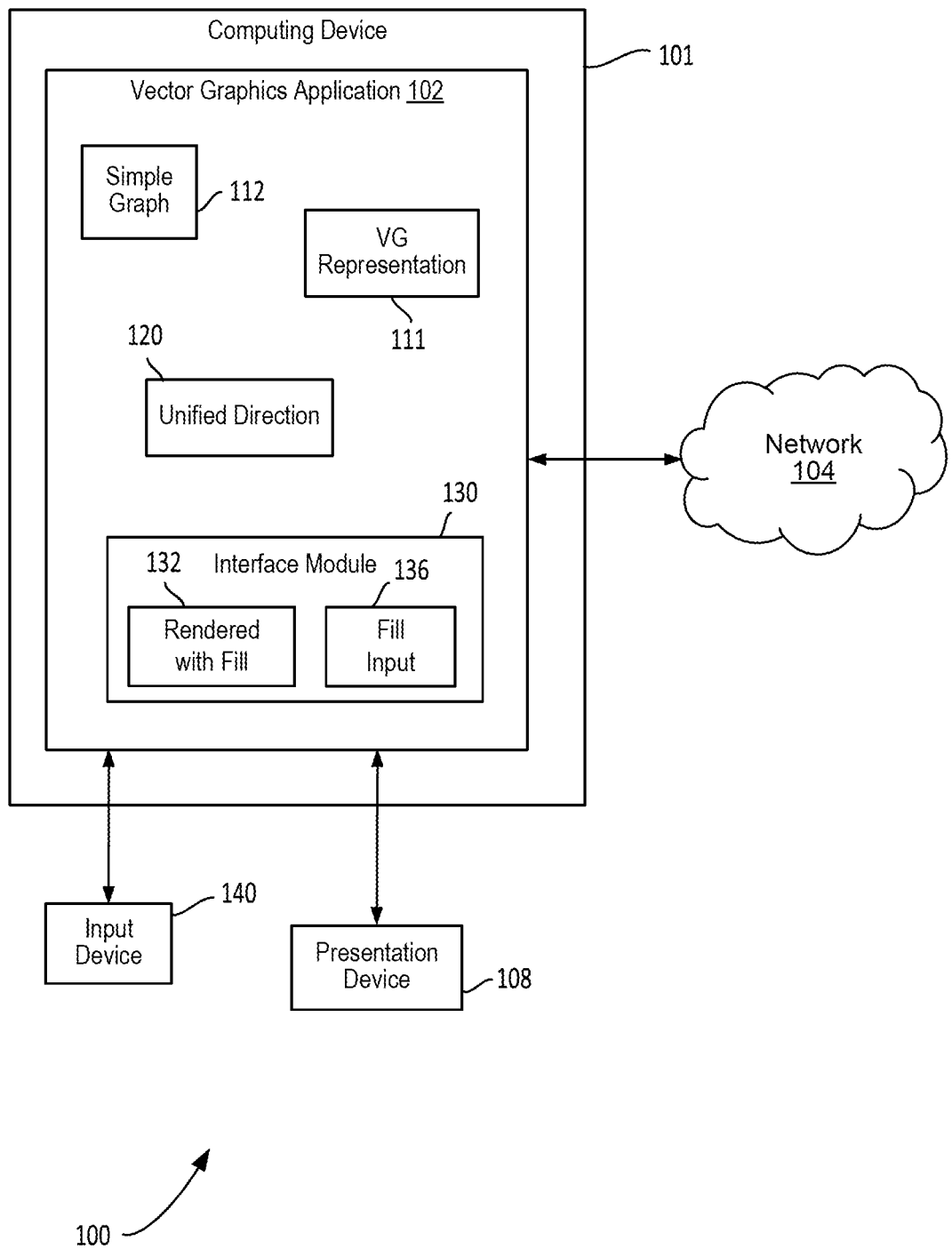
FIG. 1 is a diagram showing an example of a computing environment that renders fills for vector graphics according to certain embodiments.

Vector graphics-based representations exhibit a workflow in which the order of constructs define the constructs' relationship with one another. For example, if a point is to be inserted at a curve, dividing the curve in two, the point must necessarily be inserted at the appropriate place in an array that corresponds to the vector path. Once operations have been performed to achieve a desired representation, the representation of the graphical design can be stored and used to render a linear representation, such as a PDF or SVG. To fill a vector-graphical representation for rendering as filled, that is, define a color that appears to fill a rendered representation of the vector graph, the vector graph needs to be segmented into inside and outside regions. The inside region is then be filled while leaving the outside region alone.

However, overlapping contours of the vector graph create their own regions, which may or may not be properly recognized as being part of the inside region to be filled or part of the outside region not to be filled. To achieve accurate fills, the vector graphical design can be programmatically planarized by locating and defining all intersections within the entire graph prior to executing the fill, a computationally slow and challenging process. Alternatively, a designer can manually correct the rendered representation of the filled graphic after the fact, introducing trial and error and still making for a more time-consuming design process.

Embodiments described herein address the above issues by automatically providing, in response to a fill command input, a simplified vector graph with consistent, directional contours in order to process the fill. The simplified vector graph can then be used to render a representation without fill errors that might otherwise be caused by overlapping contours. Simplification can include separating any self-intersecting contour into multiple non-self-intersecting contours so that all contours can be aligned to the same traversal direction, for example, clockwise or counterclockwise. Alternatively, or in addition, simplification can include eliminating multiple edges and self-edges by inserting pseudo vertices (or pseudo nodes) into the vector graph.

For example, a graphical design is loaded into a vector graphics application. The vector graphics application may receive an input corresponding to a fill for a vector graphical representation for the design, or otherwise be triggered to apply a fill. The vector graphics application converts the vector graphical representation to a simple graph at least in cases where the representation includes self-intersecting contours. The vector graphics application then aligns each contour within the simple graph to provide a unified winding direction so that the simple graph can traverse contours consistently so that overlapping areas can be efficiently filled or not filled as required. The vector graphics application can then output a rendered representation with the fill using the simple graph.

The vector graphics application can also, as part of the simplification, compute a spanning tree to define edges within the vector graphical representation and add pseudo vertices to the vector graphical representation to eliminate self-edges and multiple edges. The vector graphics application can define each contour based solely on topology of the vector graphical representation.

The use of contour simplification along with directional alignment allows the vector graphical design to include junctions with any number of intersecting contours while still being accurately rendered with a fill applied. Computational efficiency is achieved by avoiding planarization of the entire vector graph. Topology and geometry are managed separately, allowing fills to be accurately processed with graphs that include many kinds of primitives making up the contours of the vector graph.

FIG. 1 is a diagram showing an example of a computing environment 100 that provides rendering fills for vector graphics according to certain embodiments. The computing environment 100 includes a computing device 101 that executes a vector graphics (VG) application 102, a presentation device 108 that is controlled based on the VG application 102 and input device 140 that receives input commands, which may include changes to a VG design, such as fills. The computing devices 101 can be communicatively coupled to other computing devices (not shown) using network 104. Other computing devices may include virtual or physical servers where vector graphical designs may be stored, or where updates to the VG application may be stored and distributed to computing devices 101. In this example, the VG application 102 includes components a VG representation 111, which may also be referred to herein has a vector graphic. The VG representation 111 includes constructs that make up contours in an active VG design. VG application 102 also includes a simple graph 112. Simple graph 112 is a vector graphical representation that is based on VG representation 111, but that has been simplified to eliminate any self-intersecting contours, and in some examples, to eliminate self-edges and multiple edges. The simple graph has also been processed so that all contours in the simple graph have a consistent orientation, either clockwise or counterclockwise, defining the direction in which all curves are traversed for processing. In this example, the choice is arbitrary and can be coded into VG application 102 or selected through input.

In the example of FIG. 1, VG application 102 also includes an interface module 130. In some embodiments, VG application 102 can produce a rendered representation 132 corresponding to a vector graph with a fill applied. In some embodiments, the VG application 102 uses an input device 140, for example, a keyboard, mouse, or trackpad, to receive input 136 corresponding to a fill for the vector graphical representation 111. Instances of the vector graphical application can be implemented on many diverse kinds of computing devices.

Figure 2:
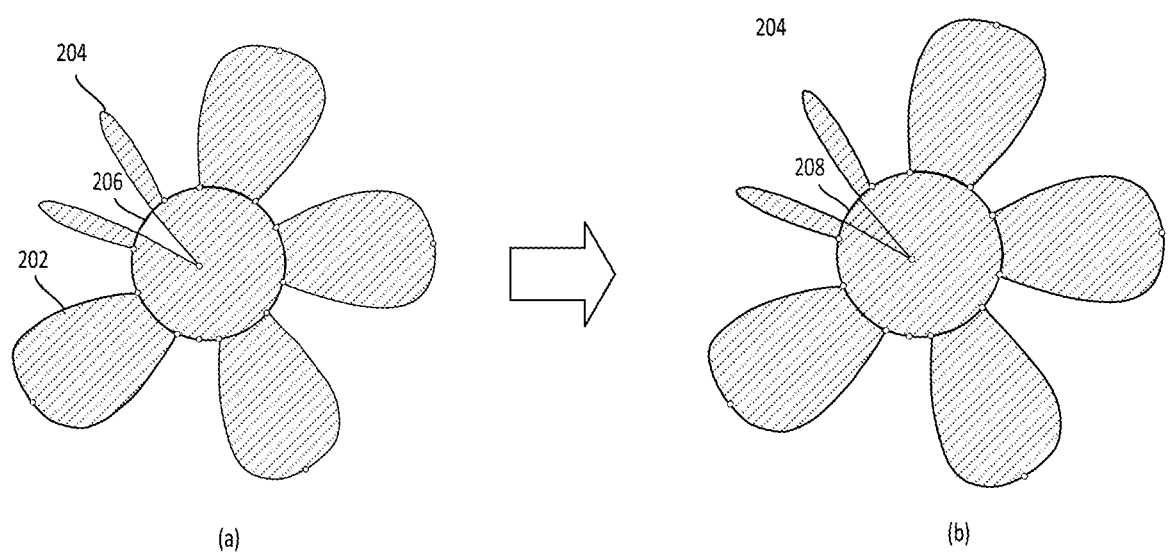
FIG. 2 is an example of a fill error caused by overlapping contours and its correction by a system for rendering fills for vector graphics according to certain embodiments.

FIG. 2 is an example 200 of a fill error caused by overlapping contours and its correction by a system for rendering fills for vector graphics according to certain embodiments. Assuming that the objective of a fill is to fill the inside region of a graphical design or portion of a graphical design, the inside of any contour within the fill region needs to be filled. Since vector graphical representations can contain only topological information, contours obtained from the fundamental basis, where non-zero windings are used as a fill rule, are not guaranteed to be non-overlapping.

The winding number in vector graphics represents the number of times that a defined curve travels around a point. Non-zero windings can lead to overlaps and self-intersections, which may lead to unpredictable fills as shown in rendering (a) of FIG. 2. In rendering (a), the flower graphic has been rendered with a fill prior to any simplification as described herein. Contour 202 is non-overlapping and is properly filled. However, contour 204 is an overlapping contour, and the overlap has resulted in an error in that area 206 is rendered as unfilled. Rendering (b) has been executed after simplification according to certain embodiments herein, resulting in filled area 208, so that the flower appears completely filled as expected. A more detailed description of the overlapping contour of the flower graphic is discussed below with reference to FIG. 8.

Figure 3:
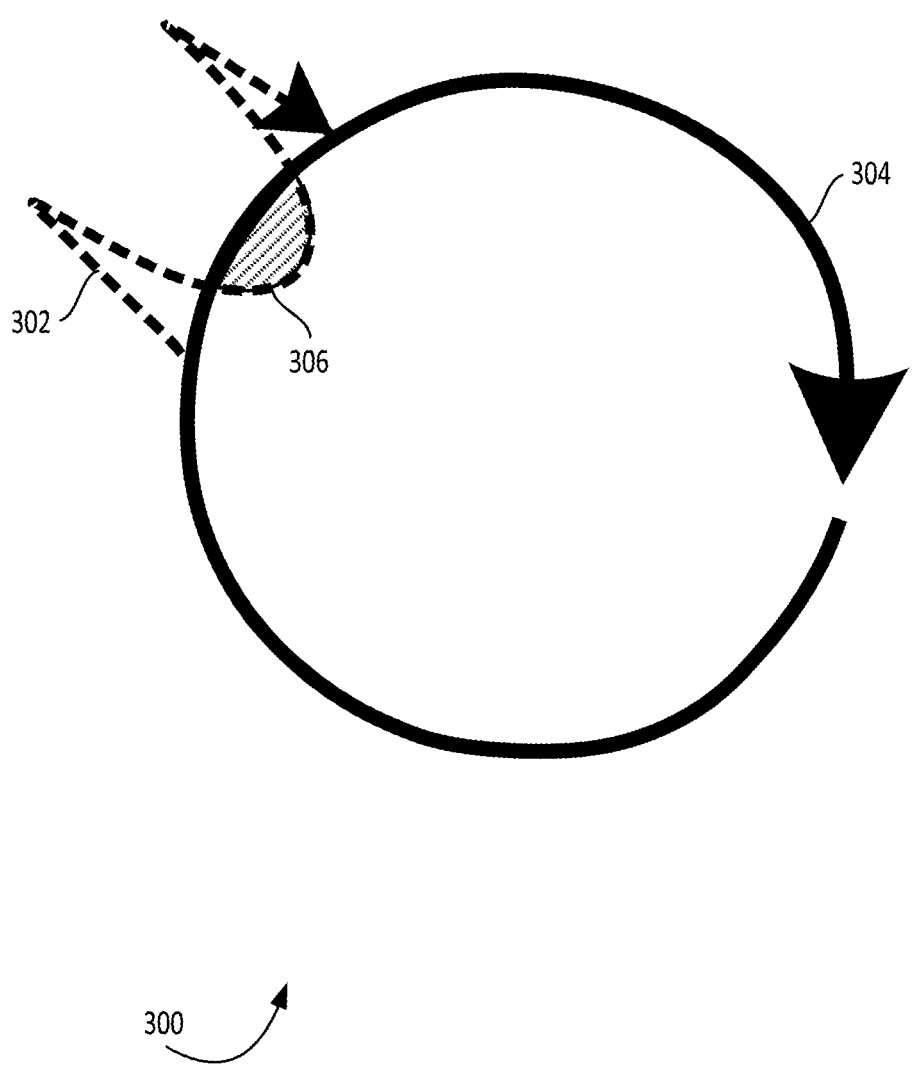
FIG. 3 is an example of overlapping contours, which may be processed to render fills for vector graphics according to certain embodiments.

FIG. 3 is an example of overlapping contours 300, which may be processed to render fills for vector graphics according to certain embodiments. If two overlapping contours are wound in opposite directions, then the overlapped region may not be filled. In FIG. 3, the contours 302 and 304 are aligned in the same direction (clockwise). However, the self-intersection between the two contours results in portion 306 of contour 302 being wound in an opposite direction (counterclockwise). Overlaps and self-intersections may lead to unpredictable fills, since the winding number also depends on the orientation of the contour and is negative if the contour travels around a point in a direction opposite of that defined to be positive. Thus, the shaded area may not be filled because the mathematical description of the two contours in the vector graphical representation cancel, falsely indicating that no contours are present in the relevant location. The process described in certain embodiments herein can resolve this issue by aligning every portion of each contour involved in the fill to the same direction, ensuring that the winding number for the overlapping area has a non-zero value.

A path is a graph of points and primitives composed using these points. These primitives include but are not limited to lines, circular arcs, Bezier curves, and conics, making this representation extensible. A vector graph or vector graphical representation as discussed herein is an undirected graph $\mathcal{G}$, defined as a tuple:

$$\mathcal{G} := (\Omega, \mathcal{T})$$

where $\Omega$ is a finite set of points from the Euclidean space $\mathbb{R}^n$, and $\mathcal{T}$ defines the connectivity of this topology. $\mathcal{T}$ is a collection of primitives. Primitives are curves in Euclidean space. A point on the curve can be mapped by parameter $t \in [1, 1]$. For purposes of this disclosure, a mapping function for a primitive ρ can be denoted by a function $\rho: [0, 1] \to \mathbb{R}^2$. Hence the starting and ending points of a curve can be defined by ρ(0) and ρ(1), respectively.

Figure 4:
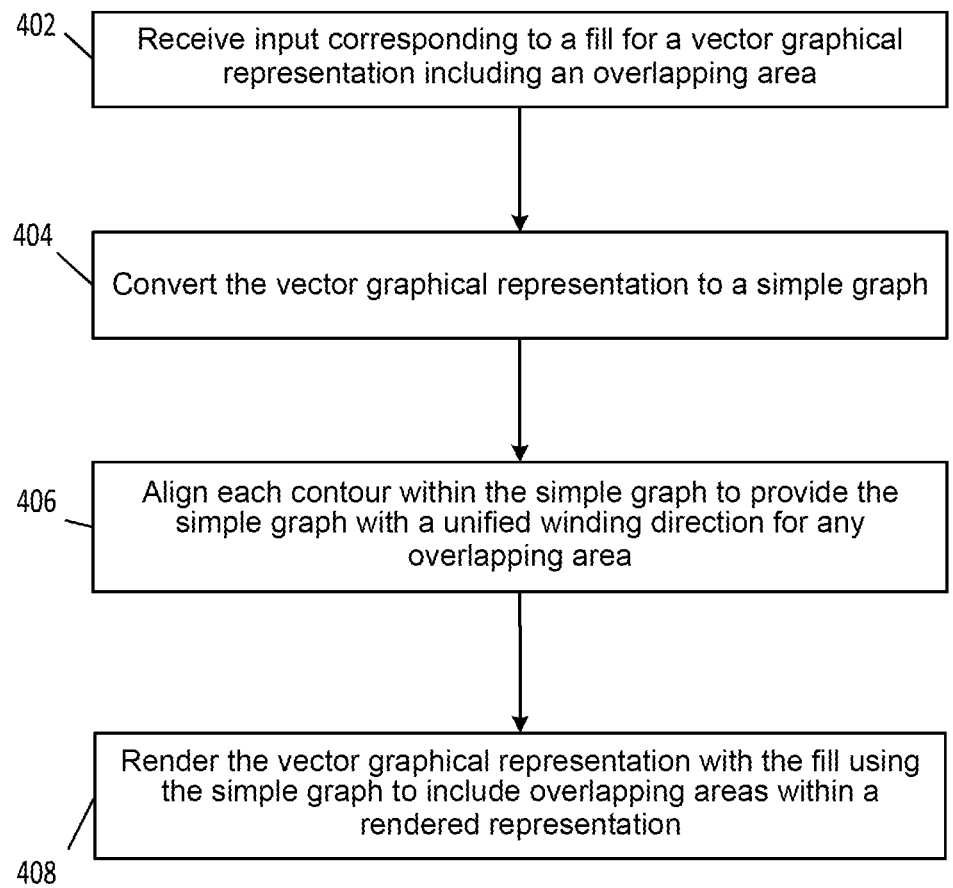
FIG. 4 is a flowchart of an example of a process for rendering fills for vector graphics according to certain embodiments.

FIG. 4 is a flowchart of an example of a process 400 for rendering fills for vector graphics according to certain embodiments. In this example, a computing device carries out the process by executing suitable program code, for example, computer program code for an application, such vector graphics application 102. At block 402, the computing device receives an input corresponding to a fill for a vector graphical representation. The vector graphical representation includes an overlapping area. The input may be received, as an example, through input device 140 and interface module 130.

At block 404 of FIG. 4, the computing device converts the vector graphical representation to a simple graph. A simple graph is a vector graph in which any multiple edges and self-edges have been eliminated by being replaced with edges that define contours between distinct start and end points. At block 406, the computing device aligns each contour within the simple graph to provide the simple graph with a unified winding direction for any overlapping area.

To solve the overlapping contour problem, the computing device can simplify the self-intersecting contours and break them down into non-self-intersecting smaller contours. The resultant contours can be changed so that all contours in the graph are oriented one direction or the other, for example, all contours can be set to be traversed counterclockwise. The simplification step involves finding intersections, which can be a computationally challenging problem. However, for simplification in the examples shown herein, only self-intersections need to be computed. The entire vector graph does not need to be planarized, resulting in a more tractable computational problem, furthering more efficient simplification. At block 408 of FIG. 4, the computing device renders the vector graphical representation with the fill that has been input to the system using the simple graph to include overlapping areas within a rendered representation as filled.

A sequence of primitives $\mathcal{S}=\{\rho_i\}_1^n$ defines an extension of a map $\mathcal{S}: [0, 1] \to \mathbb{R}^2$ to a Euclidean space:

$$S(x) := \sum_i \rho_i(x - \lfloor x \rfloor) * \delta_i(x),$$

where the Kronecker delta $\delta_i(x)$ is 1 if and only if i−1≤x<i. A contour c is of interest for purposes of this disclosure if it is defined by a sequence of primitives $\{\rho_i\}_{1 \leq i \leq n}$. That is:

$$\forall_{i \in [1, n-1]} : \rho_i(1) = \rho_{i+1}(0).$$

A contour is closed if an only if $\rho_1(1)=\rho_n(0)$, i.e., if the start and end of the contour are the same point. A contour $\mathcal{S}$ is non-intersecting if an only if $\mathcal{S}$ is injective.

Every closed contour encloses a region of $\mathbb{R}^n$. A non-zero winding number rule can be used to define the interiour of a closed contour. Let $\mathcal{I}(\mathcal{S})$ denote the interior of the closed contour $\mathcal{S}$. The definition of an interior of a closed contour can be extended vector graph $\mathcal{G}$. A point $x \in \mathbb{R}^2$ is in the interior of a graph $\mathcal{G}$ if x is in the interior of some contour $\mathcal{S}$ of $\mathcal{G}$:

$$\text{Interior}(\mathcal{G}) := \bigcup_\mathcal{S} \mathcal{I}(\mathcal{S}).$$

The fill of a closed contour $\mathcal{S}$ is a function:

$$\text{fill}_\mathcal{S}: \mathcal{I}(\mathcal{S}) \to \mathcal{C},$$

where $\mathcal{C}$ is the color space, which gives color to a point inside the contour. Similarly, the definition of fill to a vector graph can be extended by defining a function on its interior. Thus, filling a vector graph can be accomplished by identifying a suitable set of contours and filling the contours. For a consistent interior definition based on non-zero winding number, each contour is given an orientation in the same, unified direction, for example, counterclockwise.

Figure 5:
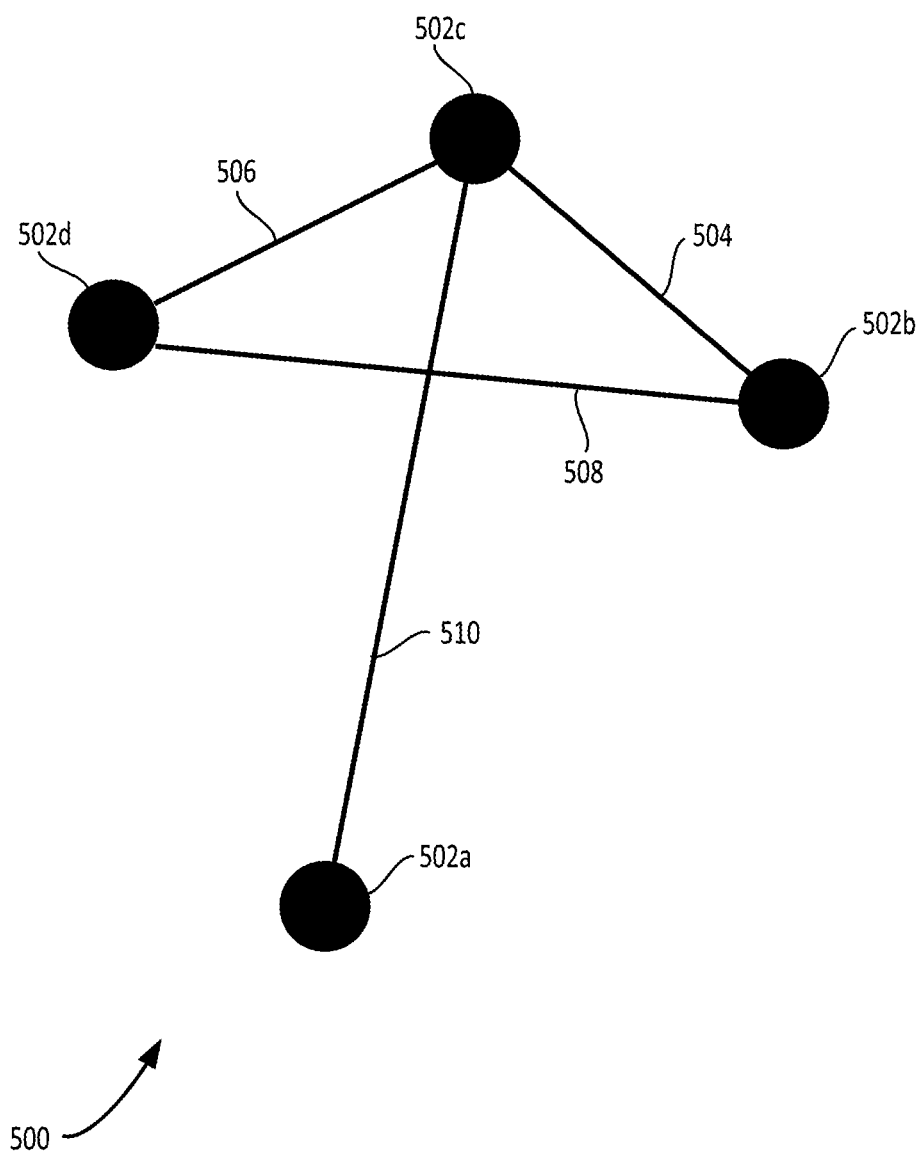
FIG. 5 is an example of simple graph used in rendering fills for vector graphics according to certain embodiments.

FIG. 5 is an example of a graph 500 used in rendering fills for vector graphics according to certain embodiments. In examples herein, the vector graphics application that computes the fundamental cycles of a vector graph can convert the vector graphical representation to a simple graph, at least in cases where the representation includes self-intersecting contours. The application works on the simple graphs in order to accurately accomplish a fill. A simple graph is an unweighted, undirected graph containing no self-edges or multiple edges. A simple graph can be more efficiently processed to provide contours that have a consistent orientation, either clockwise or counterclockwise. This direction can then define the direction in which all curves are traversed for processing.

Graph 500 is an example of a simple graph. A self-edge is a graph edge where both nodes (or vertices) that terminate the edge are the same node. A multiple edge occurs where more than one graph edge terminates in the same pair of nodes. Graph 500 is a simple graph because each node 502a-d only terminates a single edge running between the node and any other node. For example, edge 504 runs between nodes 502b and 502c. Edge 506 runs between node 502c and node 502d. Edge 508 runs between nodes 502b and node 502d and edge 510 runs between node 502a and node 502c. Edge 508 and edge 510 cross each other but are still single edges, each terminating between two nodes. To produce a simple graph, any multiple edges and self-edges in the vector graph can be eliminated by being replaced with edges that define contours between distinct start and end points. The vector graphics application can use a simple graph to output the rendered representation with a fill.

Figure 6:
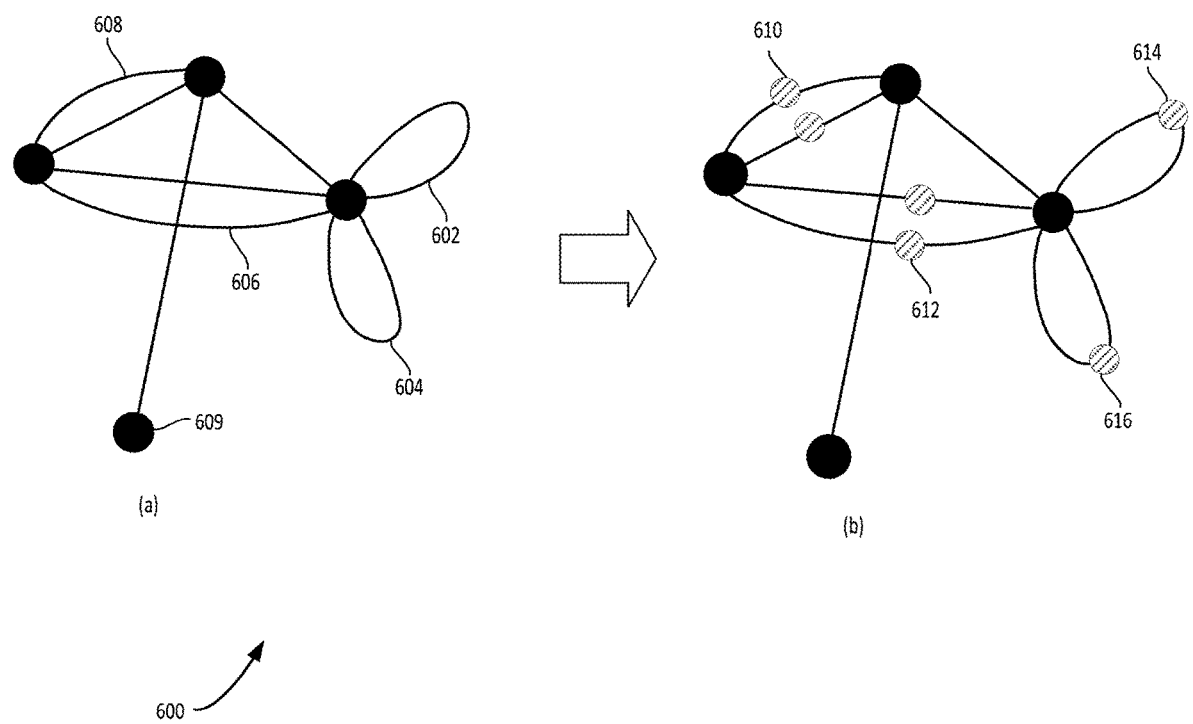
FIG. 6 is an example of a vector graph that includes multiple edges and self-edges that is processed in a system for rendering fills for vector graphics according to certain embodiments.

FIG. 6 is an example 600 of processing a vector graph that includes multiple edges and self-edges according to certain embodiments. Graph (a) in FIG. 6 includes self-edge 602 and self-edge 604, and vertices 609. Graph (a) also includes multiple edges caused by edge 606 and edge 608 each running between two vertices with another edge. Converting the vector graphical representation to a simple graph can include adding pseudo vertices to the vector graphical representation to eliminate self-edges and multiple edges from among the edges defined within the vector graphical representation. To produce a simple graph, multiple edges and self-edges are eliminated by inserting pseudo vertices to replace the multiple edges and self-edges with edges that define contours between distinct start and end points.

In graph (b), problematic edges are split by pseudo vertices, resulting in a simple graph, since all remaining edges are unique between two vertices. The vector graphics application can also, as part of the simplification of the vector graph, compute a spanning tree. The spanning tree can define the edges within the vector graphical representation. Pseudo vertices can then be added to the vector graphical representation to separate the self-edges and multiple edges. For example, pseudo vertex 610 separates original contour 608, pseudo vertex 612 separates original contour 606, pseudo vertex 614 separates original contour 602, and pseudo vertex 616 separates original contour 604. The vector graphics application can define contours based on the topology of the vector graphical representation. Self-intersecting contours can be separated into non-self-intersecting contours.

Figure 7:
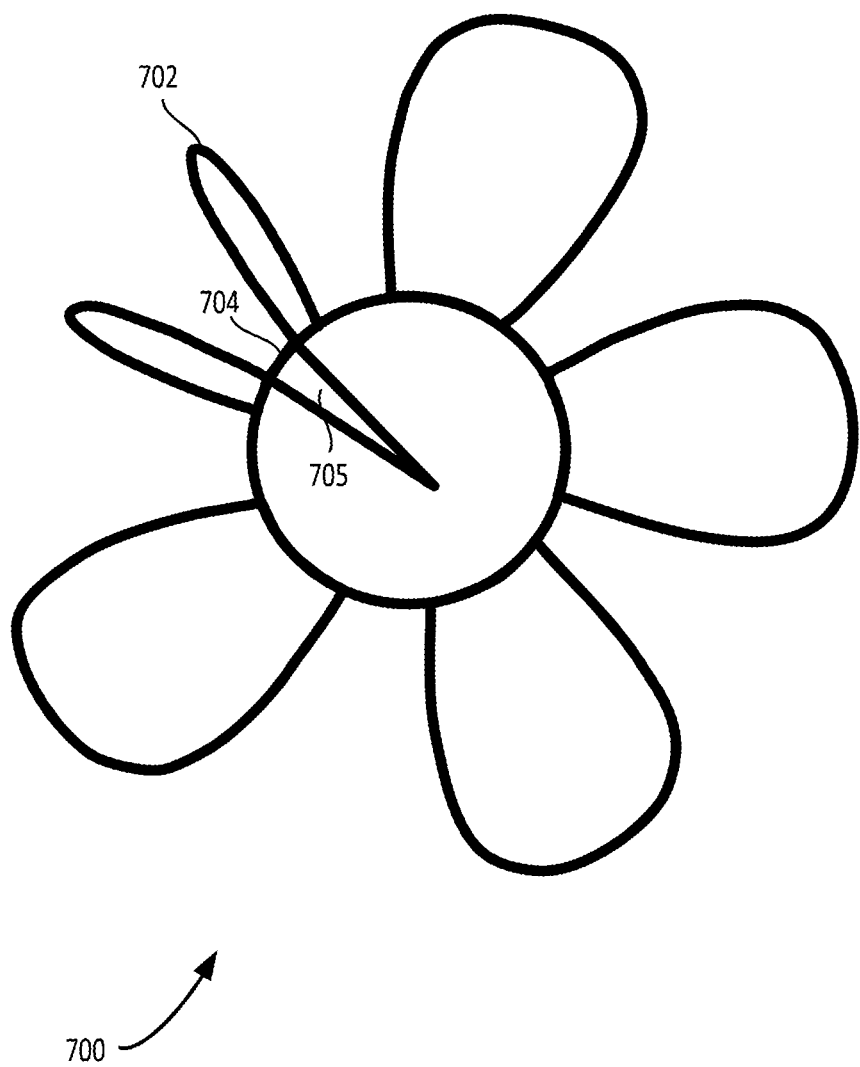
FIG. 7 is an example of a vector graph that includes overlapping contours that can be processed in a system for rendering fills for vector graphics according to certain embodiments.

FIG. 7 is an example of a vector graph 700 that includes overlapping contours that can be processed in a system for rendering fills for vector graphics according to certain embodiments. More particularly, vector graphical representation 700 is for the filled flower depicted in and discussed with respect to FIG. 2. Contour 702 reverses traversal direction on the inside of contour 704, which defines the center of the flower. Contour 702 and contour 704 overlap. Assuming that the objective of a fill is to fill the inside region of a graphical design or portion of a graphical design, the inside of any contour within the fill region needs to be filled.

Because vector graphs can contain only topological information, contours obtained from the fundamental basis, where non-zero windings are used as a fill rule, are not guaranteed to be non-overlapping. In the example of FIG. 7, the roughly triangular portion 705 of the representation, the inside of the flower, may not be filled as expected without using a simple graph. The error may arise because the contours 702 and 704 will not be traversed in the same circular direction on the inside of the flower. Because primitives of the graph are executed in the order of traversal, fill errors can result from this direction difference.

Figure 8:
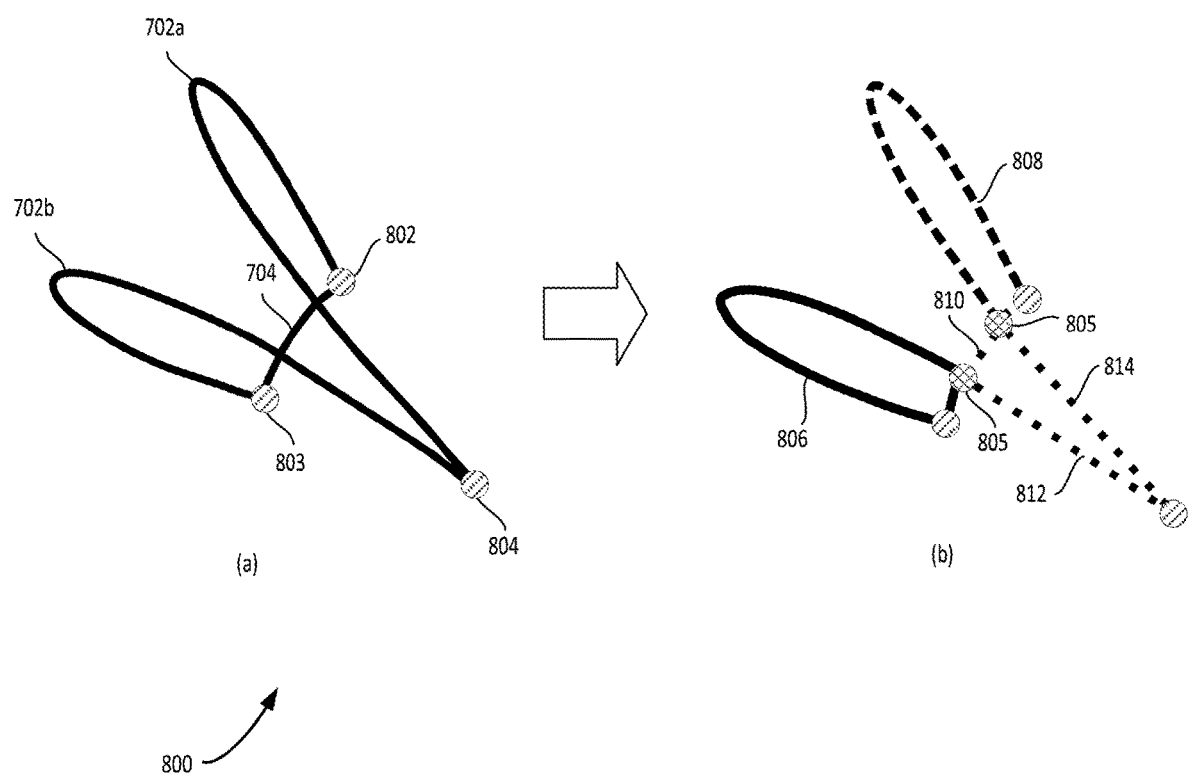
FIG. 8 is an example of simplifying the overlapping contours of the vector graph in FIG. 7 in a system for rendering fills for vector graphics according to certain embodiments.

FIG. 8 is an example 800 of simplifying the overlapping contours of the vector graph in FIG. 7. In graph (a), pseudo vertex 802 define the ends of two contours, new contour 702a and contour 704. Pseudo vertex 803 define the ends of two contours, new contour 702b and contour 704. Node 804 is defined by a direction change in original contour 702, and defines the ends of new contours 702a and 702b. In graph (b), pseudo vertices 805 have been applied to create simple contours 806, 808, 810, 812, and 814. If two primitives have the same start and end points, there are duplicate edges, and these edges can be distinguished with extra vertices such as vertices 805. These pseudo vertices can also be referred to as pseudo nodes.

The fundamental cycle basis can be computed in FIG. 8 based on the spanning tree used to define the edges so that all these contours can be traversed in the same direction. A spanning tree can be used to define the edges within the vector graphical representation. A spanning tree is a subset of a graph, which has all the vertices covered with the minimum possible number of edges. Hence, a spanning tree cannot be disconnected. A spanning tree of an undirected graph is a maximal tree sub-graph. A spanning tree will lose some of the edges of a vector graph, and an edge not present in the spanning tree of the vector graph defines a cycle. Each missing edge that is added back to the spanning tree also produces a cycle.

The use of the pseudo vertices as shown in FIG. 8 to simply the graph provides for region 705 in FIG. 7 to be filled as shown in FIG. 2(b). Simplification of a vector graph to create a simple graph can be accomplished with reference only to the topology of the graph itself for the necessary calculations. By using only the topology of the graph, simplification is accomplished efficiently with respect to computational resources required. Further details of the computations using a spanning tree are described below with respect to FIG. 9.

Figure 9:
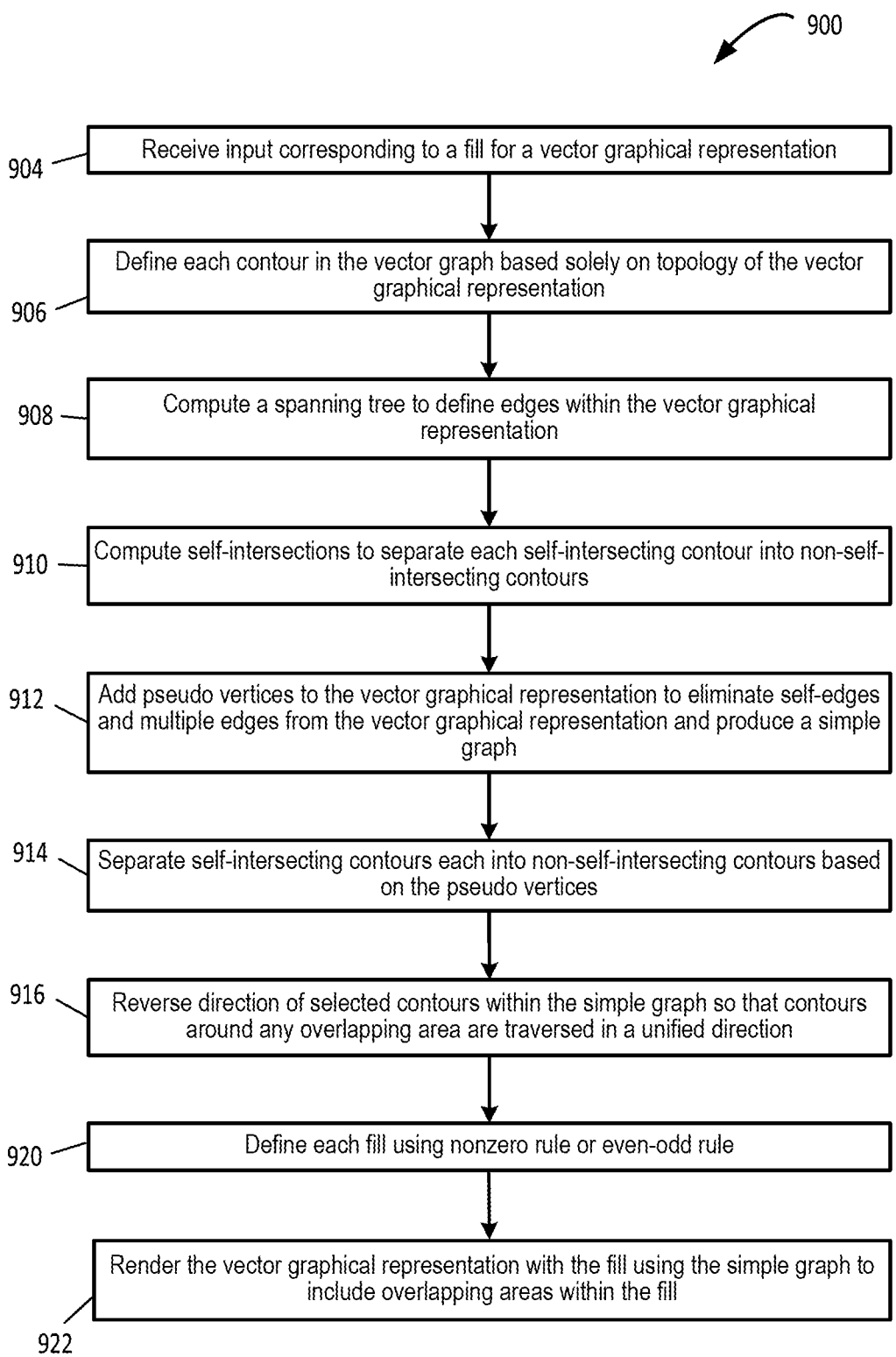
FIG. 9 is a flowchart of another example of a process for rendering fills for vector graphics according to certain embodiments.

FIG. 9 is another flowchart of another example of a process 900 for rendering fills for vector graphics according to certain embodiments. In this example, one or more computing devices carry out the process by executing suitable program code. At block 904, the computing device receives input corresponding to the fill. Input is received as described with respect to block 402 of FIG. 4. At block 906, the computing device defines each contour in the vector graph based solely on topology of the vector graphical representation. Using only the topology for calculations contributes to computational efficiency in simplifying the vector graph. A topology $\mathcal{G}$ of a vector graph $\mathcal{G}:=(\Omega,\mathcal{T})$ is an undirected graph (V,E), where the vertex set V corresponds to $\mathcal{P}$ and the edge set E corresponds to B.

At block 908 of process 900, the computing device generates a spanning tree to define the edges within the vector graphical representation. If two primitives have the same start and end points, there are duplicate edges. These edges can be distinguished with extra vertices as previously discussed. The fundamental cycles basis is computed using a spanning tree. A spanning tree (or a forest) of an undirected graph is the maximal tree sub-graph. The fundamental cycle basis can be calculated as follows:
1. Compute a spanning tree (or forest) $\mathcal{T}$ of G;
2. For each edge e∈E/$\mathcal{T}$, compute the cycle constitute of e and edges from $\mathcal{T}$.

Each fundamental cycle of the basis maps to a contour when its geometry is realized in the Euclidean space $\mathbb{R}^2$. Formally, let a fundamental cycle C be defined as a sequence of edges $\{e_i\}$, where each edge $e_i$ maps to a primitive $\rho_i$. Then a cycle C yields a closed contour $C:=\{\rho_i\}$.

The creation of the spanning tree in the above manner loses some of the edges of the vector graph. Each edge not presented in the spanning tree of the vector graph defines a cycle. Each missing edge that is added to the spanning tree produces a cycle. The difference between a contour and a cycle stems from a contour being defined by points in space that can be seen if rendered, while the vector graph is an abstract representation defined by nodes and connectivities. A connected sequence within the graph can be defined in part by the start and end vertices, and each one of these sequences is a cycle.

Continuing with FIG. 9, at block 910, the computing device computes self-intersections to separate each self-intersecting contour in the vector graph into non-self-intersecting contours and at block 912, the computing device adds pseudo vertices to the vector graphical representation to eliminate self-edges and multiple edges from the vector graph and produce the simple graph. At block 914, the self-intersecting contours are each separated by the computing device into non-self-intersecting contours using the pseudo vertices to define the ends of contours as needed to eliminate self-edges and multiple edges. At block 916, the computing device reverses the direction of selected contours within the simple graph so that contours around any and all overlapping areas are traversed in the same, unified winding direction. The functions included in blocks 906-916 and discussed with respect to FIG. 9 can be used in implementing a step for providing a simple graph corresponding to the vector graphical representation, the simple graph having a unified winding direction for an overlapping area. At block 920 of FIG. 9, each fill is defined by the computing device using a nonzero rule or an even-odd rule.

Modern graphic renderers take a vector path as an input and process it linearly, in the same manner as a vector graph is stored. Since the sequence is linear, the renderer main computational load when calculating a fill is determining the inside versus the outside of the vector graph. As examples, an even-odd algorithm a non-zero rule algorithm can be used. In either case, the computing device determines what regions of the representation are closed, and whether the primitives in the closed contour are to be executed in a clockwise order or in a counterclockwise order. Since a vector graph is not inherently sequential, but is rather a mesh, the vector graph is broken down into its connective sequence of contours to be passed to the renderer.

Once the contours are established, the inside of the shape constituted by the contours is filled with the selected color. The fill rule defines the algorithm that is used to determine the inside part of a shape to be filled. For purposes of the images presented here, the nonzero rule is used to fill the vector graphs after breaking them down into the appropriate, simplified contours, constructed from the set of fundamental cycles. At block 922, the computing device renders the vector graphical representation with the fill using the simple graph to include the overlapping areas in a rendered representation within the fill.

Figure 10:
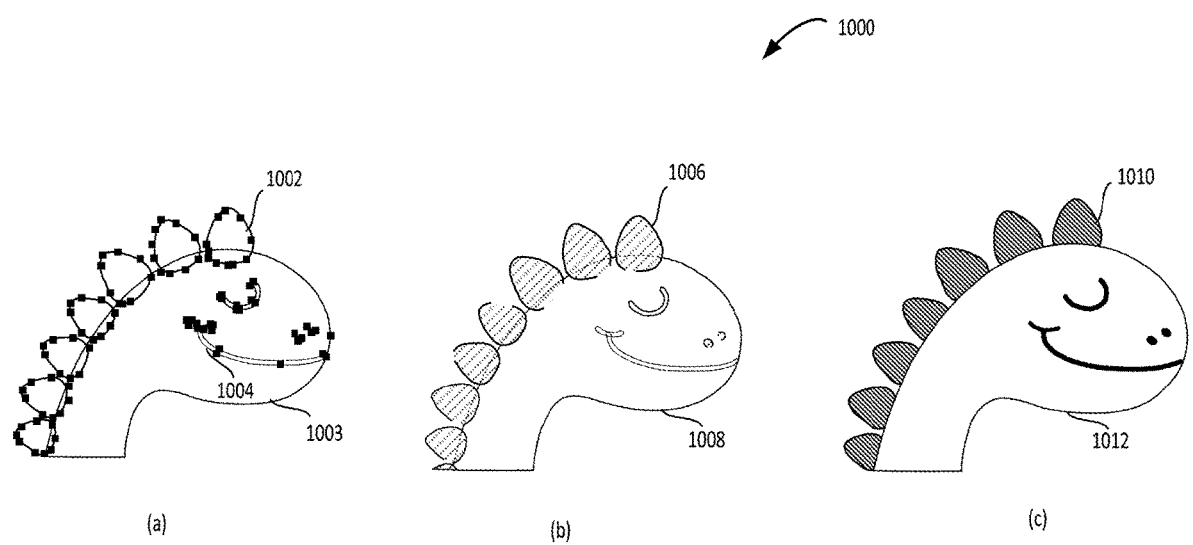
FIG. 10 is an example of rendering including fills for vector graphics according to certain embodiments.

FIG. 10 is an example of renderings 1000 including fills for vector graphics according to certain embodiments. Rendering (a), the head of happy dinosaur, includes only points and lines defined in the vector graph. Note that the dinosaur's scales 1002 are formed by contours that overlap with the dinosaur's head 1003. Facial features such as the dinosaurs' s mouth 1004 are also present. Rendering (b) shows the dinosaur rendered as filled based on the spanning tree generated by the VG application 102. Scales 1006, head 1008, and the facial features are filled to create a completely filled figure. Without the simplification described herein the portion of the dinosaur's scales that overlap with the dinosaur's body may not have been filed. Rendering (c) has been modified to separate the dinosaur into graphs for scales 1010 and head 1012, as well as the facial features. These graphs have been filled independently to create a finished figure for rendering and display, for example, using presentation device 108.

Figure 11:
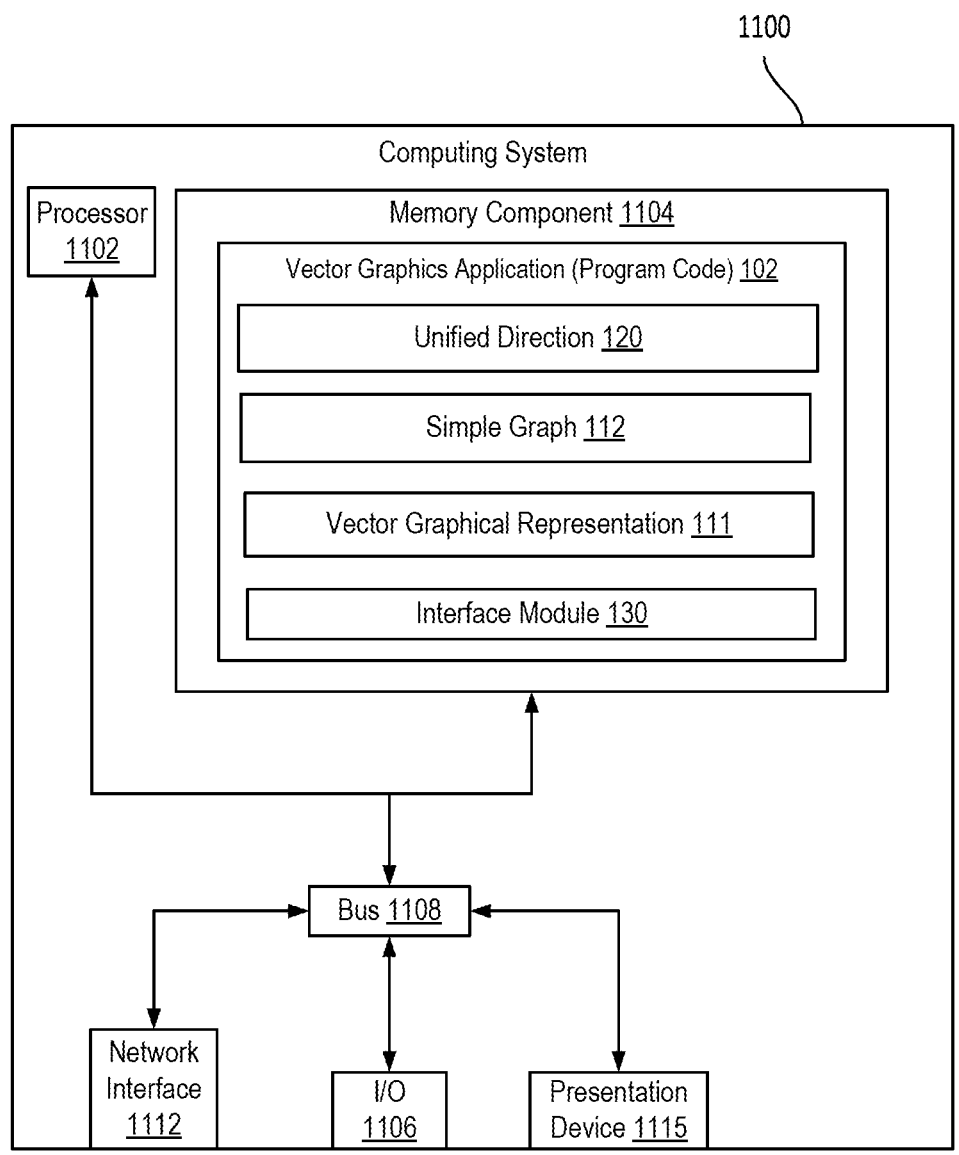
FIG. 11 is a diagram of an example of a computing system that provides fills for vector graphics according to certain embodiments.

FIG. 11 is a diagram of an example of a computing system 1100 that provides rendering fills for vector graphics according to certain embodiments. System 1100 includes a processing device 1102 communicatively coupled to one or more memory devices. The processing device 1102 executes computer-executable program code stored in the memory component 1104. Examples of the processing device 1102 include a microprocessor, an application-specific integrated circuit ("ASIC"), a field-programmable gate array ("FPGA"), or any other suitable processing device. The processing device 1102 can include any number of processing devices, including a single processing device. The memory component 1104 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, and JavaScript.

Still referring to FIG. 11, the computing system 1100 may also include a number of external or internal devices, for example, input or output devices. For example, the computing system 1100 is shown with one or more input/output ("I/O") interfaces 1106. An I/O interface 1106 can receive input from input devices or provide output to output devices (not shown). Output may be provided using the interface module 130 of the VG client application 102. One or more buses 1108 are also included in the computing system 1100. The bus 1108 communicatively couples one or more components of a respective one of the computing system 1100. The processing device 1102 executes program code that configures the computing system 1100 to perform one or more of the operations described herein. The program code includes, for example, VG client application 102 or other suitable applications that perform one or more operations described herein. The program code may be resident in the memory component 1104 or any suitable non-transitory computer-readable medium and may be executed by the processing device 1102 or any other suitable processor. Memory component 1104, during operation of the computing system, can store the vector graphical representation 111, and the simple graph 112 for the graphical design. The unified winding direction 120 for providing consistent, non-zero windings for computing fills is also temporarily stored as part of VG application 102. This value may represent either clockwise or counterclockwise as the unified winding direction and may be coded into VG application 102 or chosen through input, for example via configuration menu selection.

The system 1100 of FIG. 11 also includes a network interface device 1112. The network interface device 1112 includes any device or group of devices suitable for establishing a wired or wireless data connection to one or more data networks. Non-limiting examples of the network interface device 1112 include an Ethernet network adapter, a wireless network adapter, and/or the like. The system 1100 can communicate with one or more other computing devices (e.g., another computing device executing other software, another computing device executing another copy or instance of the VG client application (not shown) via a data network (not shown) using the network interface device 1112. Network interface device 1112 can also be used to communicate with network or cloud storage used as a repository for designs as well as updated or archived versions of the vector graphics client application 102 for distribution and installation.

Staying with FIG. 11, in some embodiments, the computing system 1100 also includes the presentation device 1115. A presentation device 1115 can include any device or group of devices suitable for providing visual, auditory, or other suitable sensory output. In examples, presentation device 1115 displays input and/or rendered images. Non-limiting examples of the presentation device 1115 include a touchscreen, a monitor, a separate mobile computing device, etc. In some aspects, the presentation device 1115 can include a remote client-computing device that communicates with the computing system 1100 using one or more data networks. System 1100 may be implemented as a unitary computing device, for example, a notebook or mobile computer. Alternatively, as an example, the various devices included in system 1100 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "accessing," "generating," "processing," "computing," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   receiving an input corresponding to a fill for a vector graphical representation, the vector graphical representation including an overlapping area;
   defining edges within the vector graphical representation;
   adding pseudo-vertices to the edges defined within the vector graphical representation to eliminate self-edges and multiple edges, thereby converting the vector graphical representation to a simple graph;
   aligning contours within the simple graph to provide a unified winding direction for the overlapping area; and
   rendering the vector graphical representation with the fill using the simple graph to include the overlapping area within a rendered representation as filled.

2. The method of claim 1, further comprising generating a spanning tree to define the edges within the vector graphical representation.

3. The method of claim 1, further comprising separating any self-intersecting contour into a plurality of non-self-intersecting contours.

4. The method of claim 3, further comprising computing self-intersections to separate the self-intersecting contour into the plurality of non-self-intersecting contours.

5. The method of claim 1, further comprising defining each contour based solely on topology of the vector graphical representation.

6. The method of claim 1, further comprising defining the fill using at least one of a nonzero rule or an even-odd rule.

7. A system comprising:
   a memory component; and
   a processing device coupled to the memory component, the processing device to perform operations comprising:
      defining edges within a vector graphical representation;
      adding pseudo-vertices to the edges defined within the vector graphical representation to eliminate self-edges and multiple edges to convert the vector graphical representation including an overlapping area to a simple graph configured to apply a fill;
      aligning contours within the simple graph to provide a unified winding direction for the overlapping area; and
      rendering the vector graphical representation with the fill using the simple graph to include the overlapping area within a rendered representation as filled.

8. The system of claim 7, wherein the operations further comprise generating a spanning tree to define the edges within the vector graphical representation.

9. The system of claim 7, wherein the operations further comprise separating any self-intersecting contour into a plurality of non-self-intersecting contours.

10. The system of claim 9, wherein the operations further comprise computing self-intersections to separate the self-intersecting contour into the plurality of non-self-intersecting contours.

11. The system of claim 7, wherein the operations further comprise defining each contour based solely on topology of the vector graphical representation.

12. The system of claim 7, wherein the operations further comprise defining the fill using at least one of a nonzero rule or an even-odd rule.

13. A non-transitory computer-readable medium storing executable instructions, which when executed by a processing device, cause the processing device to perform operations comprising:
   receiving an input corresponding to a fill for a vector graphical representation;
   defining edges within the vector graphical representation;

adding pseudo-vertices to the edges defined within the vector graphical representation to eliminate self-edges and multiple edges, thereby providing a simple graph corresponding to the vector graphical representation, the simple graph having a unified winding direction for an overlapping area; and rendering the vector graphical representation with the fill using the simple graph to include the overlapping area within a rendered representation as filled.

14. The non-transitory computer-readable medium of claim 13, wherein the operations further comprise generating a spanning tree to define the edges within the vector graphical representation.

15. The non-transitory computer-readable medium of claim 13, wherein providing a simple graph corresponding to the vector graphical representation comprises separating a self-intersecting contour in the vector graphical representation into a plurality of non-self-intersecting contours.

16. The non-transitory computer-readable medium of claim 13, wherein the operations further comprise defining a contour in the vector graphical representation based solely on topology of the vector graphical representation.

17. The non-transitory computer-readable medium of claim 13, wherein the operations further comprise defining the fill using at least one of a nonzero rule or an even-odd rule.

* * * * *